United States Patent Office 3,033,869
Patented May 8, 1962

3,033,869
α-PIPERIDINO-α-PHENYL-N-CYCLOHEXYL ACETAMIDE
Don Pierre R. L. Giudicelli, Fontenay-sous-Bois, and Henry Najer, Paris, France, assignors to Les Laboratoires Dausse, Paris, France, a company of France
No Drawing. Filed Dec. 27, 1960, Ser. No. 78,261
1 Claim. (Cl. 260—294)

This invention relates to derivatives of alpha-phenyl alpha-piperidino acetic acid and production thereof.

It is an object of this invention to provide new compounds which are useful as spasmolytic agents.

According to this invention we provide new amides of the general formula (1)
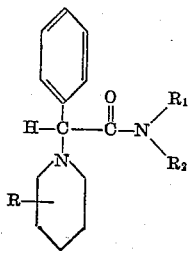

where

represents the radical of a primary or secondary aliphatic, araliphatic, alicyclic or aromatic amine, and R a hydrogen atom or an alkyl group, and acid addition salts of said amides from pharmaceutically acceptable acids, more particularly the hydrochlorides thereof.

More particularly this invention comprises the mono-n-butylamide, diethylamide, di-n-propylamide, di-n-butylamide, mono-cyclohexylamide, piperidide, monobenzylamide, mono-beta-phenyl-ethylamide, mono-phenylamide, ortho-toluidide and 2,6-xylidide of alpha-phenyl alpha-piperidino acetic acid, the diethylamides of alpha-phenyl alpha-(3-methyl)-piperidino and alpha-(4-methyl)-piperidino acetic acids, and acid addition salts from pharmaceutically acceptable acids, especially hydrochlorides, of said amides. Some of the above amides are white, crystalline compounds, the other ones being uncrystallizable oils. The amides are insoluble in water, generally soluble in ethyl alcohol and in benzene, many of them being recrystallizable from mixtures (in various proportions according to the case) of water and ethyl alcohol. With hydrochloric acid, the amides form well crystallized monohydrochlorides which are very soluble in water and insoluble in ether.

The amides generally exhibit spasmolytic properties; among the above amides, those which show such properties to the most marked degree are by order of decreasing activity the di-n-butylamide, the mono-n-butylamide and the mono-cyclohexylamide of alpha-phenyl alpha-piperidino acetic acid. The said amides also exhibit local anaesthetic properties.

According to this invention we further provide a process for the production of the amides of the general formula 1, wherein the corresponding amide of an alpha-phenyl alpha-halogeno acetic acid, particularly alpha-phenyl alpha-chloro acetic acid, is reacted in equimolecular proportion with piperidine or a 2-, 3- or 4- alkyl piperidine, in the presence of an agent for fixing the hydrogen halide produced.

The process may be carried out at an elevated temperature in an inert diluent; it is convenient to employ a diluent in which the compound to be produced is soluble and the product of fixation of hydrogen halide in insoluble; in that regard aromatic hydrocarbons for example benzene are suitable; with benzene the reaction may be carried out at reflux temperature.

The fixing agent for the hydrogen halide may be an excess of the piperidine compound employed as a reagent.

Most alpha-chloro alpha-phenyl acetic acid amides of the formula (2)
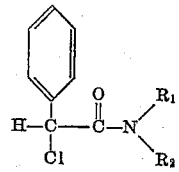

($R_1$ and $R_2$ have the above significance) are new; only those for which

represents a benzylamine, phenylamine or ortho-toluidine radical have been described.

The chloramides of formula 2 may be prepared by condensing a alpha-phenyl alpha-chloro acetic acid chloride with the amine

in equimolecular proportion, in particular in the presence of an excess of the amine. The reaction may be carried out in an inert diluent; ethyl ether is a suitable diluent, and the condensation proceeds in cold ethyl ether with a generally very good yield.

The chloramides corresponding to formula 2 are either solids having a low melting point or oils which can neither be crystallized nor distilled; many of the chloramides are soluble in cold ethyl alcohol, all being soluble in hot ethyl alcohol and insoluble in water. The solid chloramides may generally be recrystallized from mixtures of water and ethyl alcohol in a proportion which varies according to the specific compound.

The following Examples, which are not limiting, illustrate our invention.

EXAMPLE 1

(a) Alpha-Phenyl Alpha-Chloro N-Cyclohexyl Acetamide.

Into a solution of alpha-phenyl alpha-chloro acetic acid chloride (28.5 g; 0.15 mole) in anhydrous ether (200 ml.), which was cooled externally by an ice bath, cyclohexylamine (27.9 g; 0.3 mole) in ether (200 ml.) was dropped in 30 minutes while stirring and maintaining the temperature of the solution between +10 and +25° C. The mixture was left for an hour in the ice bath then 20 hours at room temperature. The compound produced was separated by filtration, copiously washed with ether, dried in vacuo, and triturated in a mortar with water (300 ml.); the insoluble portion was removed by filtration, washed with water until the washing water did no longer contain chlorine ions, then dried in vacuo over phosphorus pentoxide.

Alpha-phenyl alpha-chloro N-cyclohexyl acetamide (35.5 g; yield 94 percent) was thus obtained; recrystallized from 60 percent ethyl alcohol (365 ml.); it was a white crystalline compound, soluble in alcohol and insoluble in water and in ether. M.P. 127° C.

*Analysis.*—Calculated for $C_{14}H_{18}NOCl$: N=5.56 percent. Found: N=5.60 percent.

(b) Alpha-Phenyl Alpha-Piperidino N-Cyclohexyl Acetamide.

A mixture of alpha-chloro alpha-phenyl N-cyclohexyl acetamide (12.6 g.; 0.05 mole) and piperidine (8.5 g.; 0.1 mole) in anhydrous benzene (50 ml.) was refluxed for 11 hours.

The precipitated piperidine hydrochloride was separated by filtration and washed three times with boiling benzene, benzene was distilled from the filtrate to which the benzene washing liquors had been added, the solid residue was triturated in a mortar with water (100 ml.), the insoluble portion was separated by filtration, washed with water until the washing liquors did not contain any chlorine ions, then dried in vacuo over phosphorus pentoxide.

The alpha-phenyl alpha-piperidino N-cyclohexyl acetamide thus obtained (14.5 g.; yield 97 percent) was recrystallised from 60 percent ethyl alcohol (225 ml.) as white crystals soluble in ethyl alcohol, sparingly soluble in ether and insoluble in water; M.P. 150° C.

*Analysis.*—Calculated for $C_{19}H_{28}N_2O$: N=9.33 percent. Found: N=9.44 percent.

(c) Hydrochloride

Alpha-phenyl alpha-piperidino N-cyclohexyl acetamide (3 g.) was dissolved in cold anhydrous ether (750 ml.), the solution was filtered and dry hydrogen chloride was passed therethrough until precipitation was ended. The hydrochloride thus formed was separated by filtration, washed with ether and dried in vacuo.

Alpha-phenyl alpha-piperidino N-cyclohexyl acetamide hydrochloride (2.7 g.) was very soluble in water and in ethyl alcohol; M.P. 229° C.

*Analysis.*—Calculated for $C_{19}H_{29}N_2OCl$ (molecular weight N=8.32%; Cl=10.54%. Found: N=8.23%; Cl=10.37.

(a) Alpha-Phenyl Alpha-Chloro N,N-di-n-Butyl Acetamide

Di-n-butylamide (25.8 g.; 0.2 mole) in ether (100 ml.) was dropped in a solution of alpha-phenyl alpha-chloro acetic acid chloride (19 g.; 0.1 mol) in anhydrous ether (100 ml.), slowly enough to cause the temperature of the mixture cooled with an ice bath to remain below 25° C.

After the addition was ended, the mixture was left for an hour in the ice bath, then overnight at room temperature, the precipitated di-n-butylamine hydrochloride was removed by filtration and washed copiously with ether, ether was evaporated from the filtrate to which the ether washing liquors were added, and the oily residue was left for 2 days in an ice chest; the residue did not crystallize and was employed in crude condition in the following step.

(b) Alpha-Phenyl Alpha-Piperidino N,N-di-n-Butyl Acetamide

A mixture of crude alpha-phenyl alpha-chloro N,N-di-n-butyl acetamide (27 g.; 0.1 mole) and piperidine (17 g.; 0.2 mole) in anhydrous benzene (100 ml.) was refluxed for 10 hours. The mixture was allowed to cool, filtered to separate precipitated piperidine hydrochloride which was washed with benzene, benzene was evaporated from the filtrate to which benzene washing liquors had been added, and the oily residue was left overnight in an ice chest; no crystallization occurred.

The residue was dissolved in anhydrous ether (400 ml.), the solution was filtered over Norit, and a stream of dry hydrogen chloride was passed therethrough. The hydrochloride thus formed precipitated as an oil. The ether layer was decanted, the oil washed twice with anhydrous ether then dried in vacuo over phosphorus pentoxide.

Alpha-phenyl alpha-piperidino N,N-di-n-butyl acetamide (23.3 g.; yield 63%) was collected as a very hygroscopic crystalline compound. It was no longer hygroscopic after two recrystallizations from ethyl acetate and methyl ethyl ketone.

The hydrochloride was finally obtained as a crystalline, white substance, soluble in water and in alcohols; M.P. 164° C.

*Analysis.*—Calculated for $C_{21}H_{35}N_2OCl$ (mol. weight 366.5): N=7.63%; Cl=9.68%. Found: N=7.57%; Cl=9.60%.

The following Tables I and II indicate data in respect of a few other chloracetamides (Formula 2) and alpha-phenyl alpha-piperidino acetamides (Formula 1) prepared in a manner similar to that disclosed in Examples 1(a), 2(a) and 1(b), 2(b) respectively.

TABLE I

Compounds corresponding to Formula 2

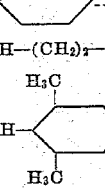

| $\begin{matrix} R_1 \\ N \\ R_2 \end{matrix}$ | Yield, percent | Recrystallization solvent | M.P., °C. | Analysis | |
|---|---|---|---|---|---|
| | | | | Percent N calc. | Percent N found |
| NH—n—$C_4H_9$ | | | [1] Oily | | |
| $N(C_2H_5)_2$ | 80 | 45% alcohol | [1] 52 | 6.20 | 6.23 |
| $N(n-C_3H_7)_2$ | 89 | 55% alcohol | [1] 53 | 5.52 | 5.55 |
| N⟨hexyl⟩ | 82 | 50% alcohol | [1] 75 | 5.89 | 5.62 |
| NH—$(CH_2)_2$—$C_6H_5$ | 84 | 70% alcohol | [1] 59 | 5.11 | 5.23 |
| NH—⟨H₃C-hexyl-H₃C⟩ | 100 | Absolute alcohol | [2] 158 | 5.2 | 5.11 |

[1] Soluble in ether; obtained from ether washing liquors.
[2] Insoluble in ether.

TABLE II
Compounds corresponding to Formula 1 and hydrochlorides thereof.

| $N\begin{smallmatrix}R_1\\R_2\end{smallmatrix}$ | R | Yield, percent | Bases Recristall. solvent | M.P., °C. | Percent C calc. | Percent C found | Percent H calc. | Percent H found | Percent N calc. | Percent N found |
|---|---|---|---|---|---|---|---|---|---|---|
| NH—n—$C_4H_9$ | H | [1] 65 | | Oily | | | | | | |
| N($C_2H_5$)$_2$ | H | [1] 73 | Non-recrystall. | Oily | | | | | | |
| N($C_2H_5$)$_2$ | $CH_3$(3) | [1] 47 | | Oily | | | | | | |
| N($C_2H_5$)$_2$ | $CH_3$(4) | [1] 56 | | Oily | | | | | | |
| N(n—$C_3H_7$)$_2$ | H | [1] 52 | | Oily | | | | | | |
| N⟨cyclohexyl⟩ | H | 84 | 50% ethyl alcohol | 98 | | | | | 9.79 | 9.82 |
| NH—$CH_2$—⟨phenyl⟩ | H | 100 | do | 88 | | | | | 9.09 | 9.18 |
| NH—$(CH_2)_2$—⟨phenyl⟩ | H | 99 | do | 133 | | | | | 8.69 | 8.70 |
| NH—⟨phenyl⟩ | H | 86 | Benzene | [5] 180 | | | | | 9.52 | 9.53 |
| NH—⟨4-methylphenyl⟩ | H | 94 | 75% ethyl alcohol | 85–86 | 77.92 | 78.1 | 7.79 | 8.2 | | |
| NH—⟨2,4-dimethylphenyl⟩ | H | 71 | 95% ethyl alcohol | [5] 193 | 78.26 | 78.2 | 8.07 | 8.40 | | |

| $N\begin{smallmatrix}R_1\\R_2\end{smallmatrix}$ | R | Yield, percent | Hydrochlorides Recristall. solvent | M.P., °C. | Percent N calc. | Percent N found | Percent Cl calc. | Percent Cl found |
|---|---|---|---|---|---|---|---|---|
| NH—n—$C_4H_9$ | H | [1] 65 | Methyl ethyl ketone | 193 | 9.01 | 8.91 | 11.43 | 11.31 |
| N($C_2H_5$)$_2$ | H | [1] 73 | do | 239 | 9.01 | 8.72 | 11.43 | 11.15 |
| N($C_2H_5$)$_2$ | $CH_3$(3) | [1] 47 | Methyl ethyl ketone + ethyl alcohol (20:3) | [2] 230–235 | 8.65 | 8.77 | 10.93 | 10.65 |
| N($C_2H_5$)$_2$ | $CH_3$(4) | [1] 56 | Ethyl acetate | [3] 123–125 | | | 10.93 | 10.93 |
| N(n—$C_3H_7$)$_2$ | H | [1] 52 | Methyl ethyl ketone | 182 | 8.27 | 8.23 | 10.48 | 10.20 |
| N⟨cyclohexyl⟩ | H | 84 | do | 253 | 8.68 | 8.23 | 11.00 | 10.74 |
| NH—$CH_2$—⟨phenyl⟩ | H | 100 | Alcohol + ethyl ether | [4] 137–138 | | | 10.30 | 10.35 |
| NH—$(CH_2)_2$—⟨phenyl⟩ | H | 99 | | [4] 128–129 | | | 9.90 | 9.88 |
| NH—⟨phenyl⟩ | H | 86 | | [6][7] 269 | 8.47 | 8.24 | 10.74 | 10.73 |
| NH—⟨4-methylphenyl⟩ | H | 94 | Absolute alcohol | [7] 252 | 8.12 | 8.09 | 10.30 | 10.18 |
| NH—⟨2,4-dimethylphenyl⟩ | H | 71 | Ethyl alcohol + methyl alcohol (5:1) | [6][7] 242–245 | 7.81 | 7.77 | 9.90 | 9.01 |

[1] Calculated as crude hydrochloride.
[2] Sublimated from 195° C; sublimated with decomposition at 230–235° C.
[3] Hygroscopic compound; melting point was not sharp.
[4] Pasty melting.
[5] Little soluble in benzene.
[6] The hydrochloride was prepared in methyl ethyl ketone, the base being insoluble in ether.
[7] Little soluble in water.

A pharmacological study of amides corresponding to Formula 1 was effected by employing either the hydrochlorides thereof (toxicity, spasmolytic and local anaesthetic activities) or the bases themselves (research of a synergy with hexobarbital).

The 50% lethal doses (LD 50) of the hydrochlorides injected intravenously in one minute to white mice were calculated according to Kaerber and Behrens and are tabulated below (reference being had to Formula 1):

| $\begin{array}{c}R_1\\N\\R_2\end{array}$ | R | LD-50 (mg./kg.) |
|---|---|---|
| NH—n—$C_4H_9$ | H | 55 |
| N—$(C_2H_5)_2$ | H | 30 |
| N$(C_2H_5)_2$ | $CH_3(3)$ | 55 |
| N$(C_2H_5)_2$ | $CH_3(4)$ | 27 |
| N(n—$C_4H_9)_2$ | H | 25 |
| N(n—$C_3H_7)_2$ | H | 25 |
| NH—⟨phenyl⟩ | H | 52 |
| N—⟨cyclohexyl⟩ | H | 40 |
| NH—$CH_2$—⟨phenyl⟩ | H | 16 |
| NH—$(CH_2)_2$—⟨phenyl⟩ | H | 7 |
| NH—⟨cyclohexyl⟩ | H | 57 |
| NH—⟨phenyl-$H_3C$⟩ | H | 50 |
| NH—⟨phenyl-$(H_3C)_2$⟩ | H | 16 |

The amides according to this invention were found to have a mixed spasmolytic activity the musculotropic component of which being preponderating; some of them, viz. the mono-n-butyl amide and the di-n-butyl amide are from 3 to 4 times more active than papaverine as to the spasm of guinea-pig ileum caused by barium chloride; on the contrary the anticholinergic component is weak since the compounds counteracted the effects of acetylcholine on the guinea-pig ileum only at concentrations 10 to 100 times greater than that at which adiphenine shows activity.

The amides were also found to exhibit local anaesthetic properties, fairly marked in some cases, the mono-cyclohexylamide and the mono-phenylethylamide being 3 to 4 more active than cocaine. Furthermore several amides were found to have a conduction anaesthetic potency proximate to that of cocaine. However the amides produced irritating effects either on cornea or at the places where they were introduced into the derm or under the skin.

Finally by means of the rat return-to-sleep test (P. Lamson et al., J. Pharmacol., 1952, 106, 219; L. Buchel et al., J. Physiol. Paris 1956, 48, 515; L. Buchel et al., Anesthésie et Analgésie, 1957, 14, 921; L. Buchel et al., Comptes-Rendus 1958, 246, 3923), we evidenced a synergy between hexobarbital and some of the above amides, particularly the monophenyl amide, the monobenzylamide and the monophenylethylamide. The last two compounds caused the return to sleep of animals in the proportion of 100% at a dose of 50 micrograms per gram and the duration of the second sleep was as long as 2 hours in the case of the monobenzylamide.

The above amides particularly the di-n-butylamide, the mono-n-butylamide and the mono-cyclohexylamide of alpha-phenyl alpha-piperidino acetic acid are preferably administered orally as tablets containing 0.025 or 0.050 g. of the same together with a conventional tablet excipient, such as a mixture of corn starch, lactose, talc and magnesium stearate, or endorectally as suppositories containing 0.025 or 0.050 g. of the amide together with a conventional suppository excipient such as the Imhäusen excipient.

What we claim is:

A member of the class consisting of monocyclohexylamide of alpha-phenyl alpha-piperidino acetic acid of the formula

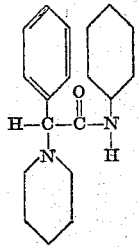

and the hydrochloride thereof.

References Cited in the file of this patent

UNITED STATES PATENTS

| 2,952,685 | Najer et al. | Sept. 13, 1960 |
| 2,957,880 | Rometsch | Oct. 25, 1960 |

OTHER REFERENCES

Janssen "J. Am. Chem. Soc." vol. 76, pages 6192—6193 (1954).